United States Patent
Corrado

(10) Patent No.: US 8,570,183 B2
(45) Date of Patent: Oct. 29, 2013

(54) METHOD FOR DETECTING GROSS VEHICLE WEIGHT OVERLOAD

(75) Inventor: Anthony P. Corrado, Elbert, CO (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 67 days.

(21) Appl. No.: 13/082,714

(22) Filed: Apr. 8, 2011

(65) Prior Publication Data

US 2011/0248861 A1 Oct. 13, 2011

Related U.S. Application Data

(60) Provisional application No. 61/322,495, filed on Apr. 9, 2010.

(51) Int. Cl.
*G08B 21/00* (2006.01)
*B60Q 1/00* (2006.01)
*B60T 8/18* (2006.01)

(52) U.S. Cl.
USPC ........ 340/666; 340/435; 340/425.5; 303/22.6

(58) Field of Classification Search
USPC .................... 340/666, 435, 425.5; 303/22.6
See application file for complete search history.

(56) References Cited

U.S. PATENT DOCUMENTS

| | | | |
|---|---|---|---|
| 5,603,556 A * | 2/1997 | Klink | 303/22.6 |
| 6,025,563 A * | 2/2000 | Lesesky et al. | 177/136 |
| 6,086,509 A * | 7/2000 | Johnson et al. | 477/97 |
| 8,170,781 B2 * | 5/2012 | Fuwa | 701/124 |
| 2010/0305840 A1 * | 12/2010 | Doi | 701/124 |
| 2011/0093239 A1 * | 4/2011 | Holbrook et al. | 702/174 |
| 2011/0098884 A1 * | 4/2011 | Doi | 701/36 |

* cited by examiner

*Primary Examiner* — George Bugg
*Assistant Examiner* — Munear Akki
(74) *Attorney, Agent, or Firm* — Robert K. Tendler; Daniel J. Long

(57) ABSTRACT

A method of detecting gross weight overload of a vehicle comprising the steps of positioning one or more ultrasonic sensors on the vehicle so that said sensors measure the distance to a ground surface, using the sensors to measure height above the ground surface of the vehicle in a non-overloaded condition, adding known weights to the vehicle until maximum gross vehicle weight (GVW) is attained, ascertaining height above the ground surface at this gross vehicle weight (GVW), and continuously measuring height of the ground surface and collecting height above the ground surface data to establish when an overload condition occurs.

17 Claims, 3 Drawing Sheets

METHOD FOR DETECTING GROSS VEHICLE WEIGHT OVERLOAD

RELATED APPLICATIONS

This application claims rights under 35 USC §119(e) from U.S. Application Ser. No. 61/322,495 filed Apr. 9, 2010, the contents of which are incorporated herein by reference.

FIELD OF THE INVENTION

The invention relates generally to the field of detecting the safe loading and operation of vehicles by determining the height above ground on a continuous basis, and more particularly to a method and device that uses ultrasonic energy to measure the height above ground and to compare this value to pre stored, calibrated values.

BACKGROUND OF THE INVENTION

There is a need for determining when class 2-8 vehicles are loaded such that the vehicle Gross Vehicle Weight (GVW) limits are exceeded due to inadvertent or deliberate weight added to the design feature for a vehicle. Presently there are no easily installed sensor devices or methodologies that enable such a determination. In commercial applications where vehicle up fitters start with a bare chassis, add vehicle structure and then allow the ultimate operator/user to add additional weight such as tools or materials, the vehicle can easily be overloaded in excess of the manufacturers intended weight limits. Such overloading produces both unsafe operating conditions as well as contributing to vehicular wear and tear in excess of its intended use.

A need exists for an inexpensive highly reliable sensor that can be fitted to a vehicle chassis, connected to the vehicle data bus and be used to continuously monitor and determine the operating condition of the vehicle.

More particularly, with respect to the operation of fleet vehicles there are three problems. The first problem is one of reliability. If a vehicle is overloaded then parts of the truck are strained and various mechanical systems can break down. Thus truck reliability is directly proportional to any overloaded conditions that may occur.

Second is a safety issue. If the trucks are overloaded they do not handle particularly well. If for instance one considers a boom truck, and if the right side of the truck has 1,000 pounds more than the left side, then if the boom operator is extending in that direction he will be exceeding the safety limits of the truck. Thus, weight distribution and thus truck leveling can involve a safety issue.

Third is a legal compliance issue meaning whether or not the maximum gross vehicle weight has been exceeded.

While trucks are provided with a gross vehicle weight rating such as 30,000 or 40,000 lbs, instructions to the operator simply not to exceed this rating are ineffective as there presently is no continuous monitoring of the loaded weight of the vehicle.

Moreover, when trucks are manufactured they are given a gross vehicle weight rating which does not take into account any additional equipment that is added to a truck. For instance, any additional equipment that is added to the truck is not taken into account in the weight rating. By way of example, customers will start to put tools and equipment on a newly bought or leased truck and may for instance fill up utility bays with equipment. However, once the truck leaves the factory there is no way to easily ascertain whether the loaded truck is within the maximum gross vehicle weight rating assigned to the truck, or for instance how the truck is maintained with respect to the rating.

It is noted that a 40,000 pound truck is a great deal more expensive than a 35,000 pound truck, and cost is a major issue with fleets seeking to buy the cheapest vehicle that they can. As a result of buying a cheaper truck, owners or operators typically overload them. It has been thought that perhaps as many as 60% of the vehicles go out on the road at one time or another where the vehicle's gross vehicle weight exceeds the maximum.

Thus, for instance, while the trucks may leave the factory in a compliant condition they are essentially shipped as an empty truck. Typically utility operators decide what is going to be carried on a truck with no particular thought to the final weight of the loaded truck. In short, there is no convenient way to give a truck operator an immediate understanding that his vehicle is overloaded or that uneven loading or a load shift has occurred which may result in tipping or unsafe operation.

SUMMARY OF THE INVENTION

In the subject invention the height of the vehicle above the ground is monitored to detect safe loading and vehicle operation. The sensed height is compared to a prestored calibrated value corresponding to the minimum allowable height to which a vehicle can sink under load, with this height corresponding to the maximum allowable gross vehicle weight.

In one embodiment height sensing is provided by known and produced automotive ultrasonic sensors. These sensors produce a series of pulsed ultrasonic energy and measure the distance from their mounting location to the ground. They are very accurate and are calibrated to filter the effects of temperature, thus making them accurate over all temperature conditions.

This invention relates to mounting one or more of these devices rigidly to the chassis of a vehicle so that the sensor is pointing directly vertically downward at the ground surface. The ultrasonic sensor is energized whenever the vehicle power is applied. The device emits a series of pulses and the "time for first return" pulse is measured and calibrated for temperature effects. This value measures the height above ground of the sensor and corresponds directly to the load of the vehicle on the spring subsystems and thus the gross vehicle weight.

In one embodiment, this value of height above ground is calibrated during up fitting by obtaining the height above ground for an empty vehicle. The vehicle is then weighed at a scale and the height above ground corresponds to the "unloaded" weight of the vehicle. Known and calibrated weights are then added to the vehicle and the height above ground is measured until the vehicle maximum gross vehicle weight (GVW) is attained. The distance that the chassis has sunk due to the maximum loading is measured and corresponds to the minimum allowable height above ground. This minimum allowable height in turn corresponds to the maximum vehicle spring deflection and maximum gross vehicle weight allowed by law.

In one embodiment, as the vehicle enters service this height above ground is measured on a continuous basis. Algorithmic filtering is applied that will, in an exemplary embodiment, discard highly variable and non repeatable measurements due to differing road surfaces such as cement, gravel, dirt or mud. The filtering also coordinates all of the measurements that are determined to be indicative of road surfaces. A mean height above ground measurement is obtained and this information is sent to the vehicle data bus for transmission to the data collector. The collected data may be directly displayed, or it may be averaged and thresholded and an alarm actuated when a threshold has been exceeded. This gives the driver of a truck an instant indication of an overloaded condition. When multiple sensors are used, vehicle tilt can be sensed by differing distances above ground and an alarm indicator can be actuated when tilt thresholds are exceeded.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
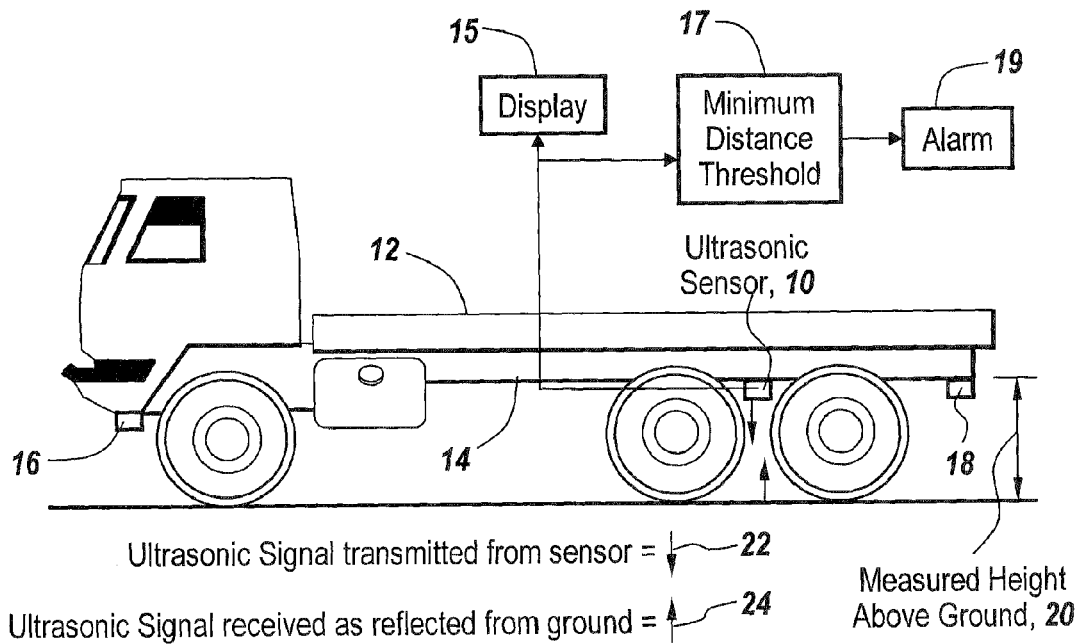
FIG. 1 is diagrammatic illustration of the typical elements of a vehicle-mounted height-measuring system on a bare vehicle chassis before any work configurations have been added.

Referring now to FIG. 1, one embodiment of the subject system is shown. Here an ultrasonic sensor 10 of the automotive types currently used for "back up" and "obstacle" detection is mounted to a truck 12 frame 14. The distance above ground is measured and is displayed at display 15. The output of the sensor may also be averaged and thresholded at 17 in one embodiment, and if the vehicle chassis sinks below a predetermined minimum distance threshold an alarm 19 is activated.

The above enables certified devices to be used that are in high volume production, devices that are equipped with CAN bus interfaces and devices that are already temperature compensated.

Note that multiple vehicle height sensors can be used. For instance, two sensors located on either side of the chassis enable average height to be determined. These sensors also provide an indication of vehicle tilt, another unsafe operating condition. Thus if the difference in side-to-side distances to ground exceed some threshold indicating unsafe tilt, an alarm can be actuated. In addition, sensors 16 and 18 can be fixed respectively to the front wheel area and rear wheel area of vehicle 12. Such an arrangement provides an indication of vehicle tilt from front to rear, another condition that if outside of a safe range could result in a safety issue and can be used to trigger an alarm.

Here ultrasonic sensor 10 provides a distance measurement above ground 20 due to the transmission of a pulsed ultrasonic signal 22 down towards the ground where it is reflected upwardly as illustrated at 24. In one embodiment, ultrasonic sensor 10 is shown mounted on vehicle chassis 14 at the center of the sprung weight. The distance 20 is the measured height above ground. Arrow 22 represents the transmitted ultrasonic pulse train emitted by the sensor 10. The return signal is represented by arrow 24. The timing difference between the pulses represented by signals 22 and 24 is correlated to the height above ground.

Figure 2:
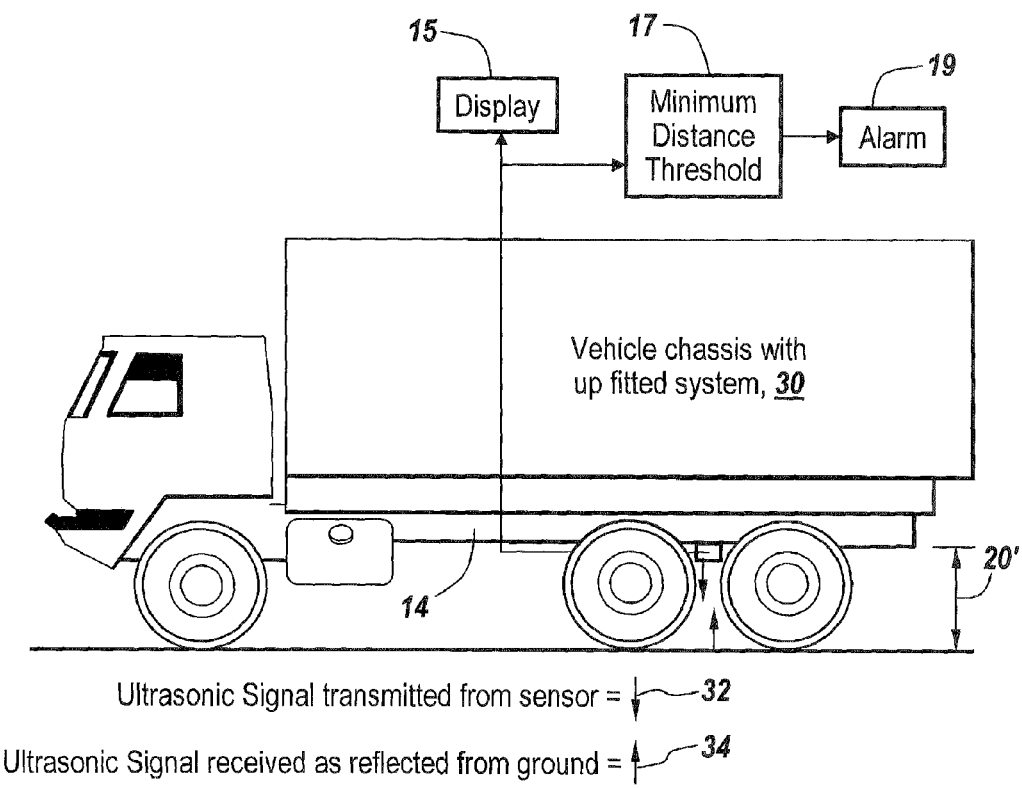
FIG. 2 is a diagrammatic illustration in which a vehicle body is added to a bare chassis; and, FIG. 3 is diagrammatic illustration of a vehicle in an overloaded condition.

With reference to FIG. 2, the condition is shown where a normal truck body 30 is up fitted to the bare vehicle chassis 14. In this configuration the height above ground 20' represents the unloaded condition for an empty truck. Additional weight can be added to represent tools or other devices that would normally be a part of the vehicle in an empty non-overloaded condition. At this point, the vehicle weight is obtained and verified by using a truck scale. This condition is recorded as the empty weight rating and the height above ground is measured. This height corresponds to the delivered vehicle weight rating and can be used as a benchmark.

Thereafter, measured weight is added to the truck until the maximum gross vehicle weight is reached as measured by a truck scale. The distance above ground to which the chassis has sunk is then measured and is recorded as the minimum distance above ground corresponding to a "not-to-exceed weight". This minimum distance is then set as threshold 17. If the truck sinks below this minimum distance, then the above threshold is exceeded and an alarm 19 may be activated.

Here, vehicle body 30 is added to bare chassis 14. In this figure the height above ground 20' is less than that of FIG. 1 due to the added weight of body 30. The emitted ultrasonic signal is pulse 32 and the received pulse is illustrated at 34.

Figure 3:
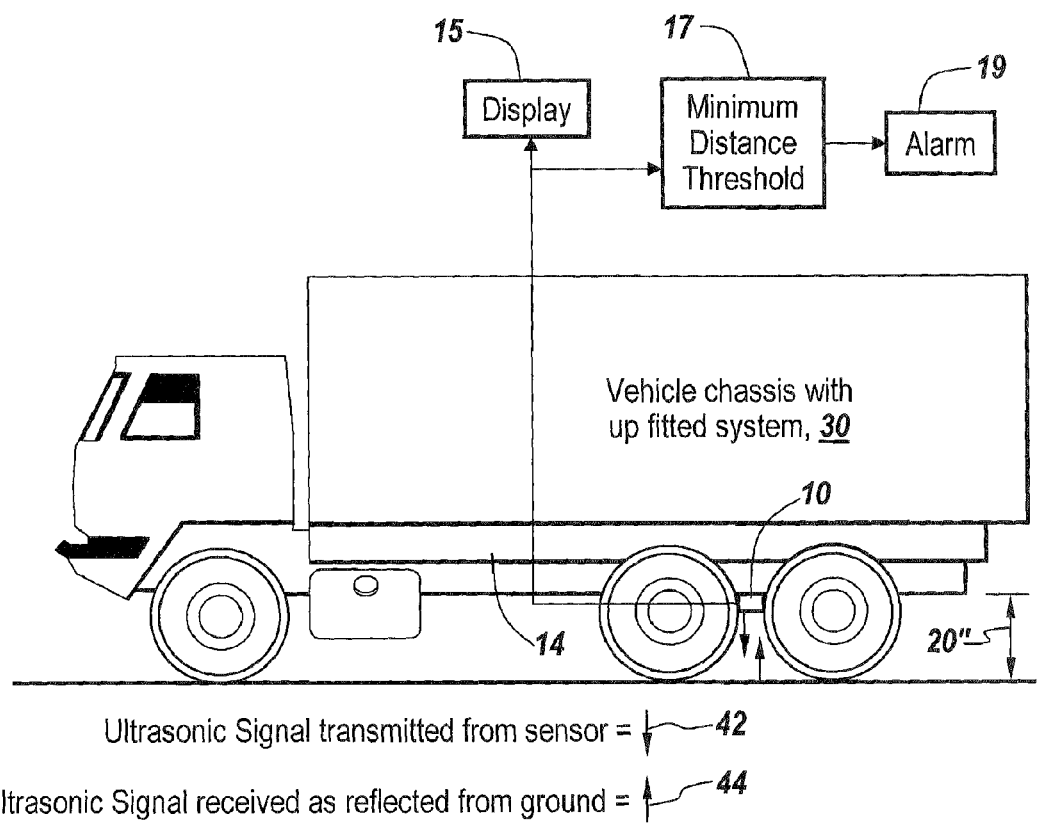

Referring now to FIG. 3, what is shown is when the vehicle gross weight exceeds the allowed operating weight. In this case, the height above ground 20'' is significantly lower than in either of the previous scenarios and represents an overloaded condition. The transmitted and received pulses are shown as 42 and 44 respectively.

While ultrasonic sensors are described to ascertain vehicle height, other height measuring systems are within the scope of this invention such as optical sensors or dual beam infrared sensors, as well as focus-defocus range finding sensors. Moreover, height measuring in general may be used to measure any unsafe or out-of-specification vehicle condition and is within the scope of the subject invention.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Method of detecting gross vehicle weight of a vehicle, comprising the steps of:
   positioning a vehicle height sensor on the vehicle such that the sensor measures the distance to a ground surface;
   loading the vehicle until the maximum gross weight of the vehicle is attained;
   ascertaining from the output of the sensor the height above the ground surface corresponding to a minimum height above ground associated with a maximum gross vehicle weight; and,
   indicating when the measured height is below said minimum height above ground; the vehicle having at least one additional sensor spaced from the first mentioned sensor and further including the steps of measuring the height above ground at each of the sensors to provide a baseline and subsequently measuring height above ground of the sensors and indicating when there is a predetermined difference in the height measurement between the baseline measurement and the subsequent corresponding measurement.

2. The method of claim 1, wherein the sensors include an ultrasonic sensor.

3. The method of claim 1, wherein the sensors include an optical sensor.

4. The method of claim 1, wherein the sensors include a dual beam IR sensor.

5. The method of claim 1, wherein the sensors include a focus/defocus range finding sensor.

6. The method of claim 1, and further including averaging the output of a sensor so as to establish a mean average height.

7. The method of claim 6, and further including the step of comparing the mean average height above ground to said minimum height above ground to determine that the maximum gross vehicle weight has been exceeded.

8. The method of claim 1, wherein the predetermined difference in height measurement corresponds to the tilt of the vehicle.

9. The method of claim 8, wherein the sensors are spaced transversely to the centerline of the vehicle.

10. The method of claim 8, wherein the sensors are spaced fore and aft to measure the fore and aft tilt of the vehicle.

11. The method of claim 8, and further including the step of providing an alarm indicating when the measured tilt exceeds a predetermined threshold.

12. A method for measuring a predetermined condition of a vehicle comprising the steps of:
   measuring the height of the vehicle above a ground surface and the tilt thereof using two sensors; and,
   determining when the measured height and tilt is outside a predetermined range; the vehicle having at least one sensor snared from the other of the two sensors and further including the steps of measuring the height above ground at each of the sensors to provide a baseline, subsequently measuring height above ground of the sensors and indicating when there is a predetermined difference in the height measurement between the baseline measurement and the subsequent corresponding measurement.

13. The method of claim 12, wherein the predetermined range includes a range corresponding to an unsafe condition.

14. The method of claim 12, wherein the predetermined range is an out-of-specification range.

15. The method of claim 12, wherein the sensed height is due to vehicle loading and wherein an alarm condition is initiated when the sensed height of the vehicle is a below a minimum height threshold.

16. The method of claim 15, wherein the minimum height threshold is that associated with a maximum allowable gross vehicle weight.

17. Apparatus for measuring a predetermined condition of a vehicle comprising:
   a pair of sensors for measuring the height of the vehicle above a ground surface and the tilt thereof; and,
   a unit determining when the measured height and tilt is outside a predetermined range; the vehicle having at least one of said sensors spaced from the other of said pair of sensors, said unit measuring the height above ground at each of the sensors to provide a baseline and subsequently measuring height above ground of the sensors and indicating when there is a predetermined difference in the height measurement between the baseline measurement and the subsequent corresponding measurement.

* * * * *